United States Patent [19]

Suen et al.

[11] 3,948,976

[45] Apr. 6, 1976

[54] PARTIAL ESTERS OF HYDROXY POLYCARBOXYLIC ACIDS

[75] Inventors: Tzeng Jiueq Suen, New Canaan; Arthur James Begala, Jr., Fairfield; Martin Grayson, Stamford, all of Conn.

[73] Assignee: American Cyanamid Company, Stamford, Conn.

[22] Filed: Mar. 29, 1974

[21] Appl. No.: 456,120

[52] U.S. Cl. .............. 260/484 P; 252/82; 252/396; 260/484 R
[51] Int. Cl.$^2$.......................................... C07C 69/70
[58] Field of Search.......... 260/484 P, 484 B, 484 R

[56] References Cited
UNITED STATES PATENTS

| | | | |
|---|---|---|---|
| 2,602,065 | 7/1952 | De Groote | 260/484 B |
| 2,679,520 | 5/1954 | De Groote | 260/484 B |
| 2,723,285 | 11/1955 | De Groote | 260/484 B |
| 3,401,127 | 9/1968 | Stephenson | 260/484 P |

Primary Examiner—Lorraine A. Weinberger
Assistant Examiner—P. J. Killos
Attorney, Agent, or Firm—Gordon L. Hart; Robert J. Feltovic

[57] ABSTRACT

Partial esters of hydroxy-polycarboxylic acids having at least one unesterified carboxyl group and at least one other carboxyl group esterified with an alcohol having one to 20 repeating oxyalkylene groups and a terminal hydrocarbon radical are useful as additives for inhibiting corrosion and scale on metal parts in a circulating water system. Especially suitable for the use are alkyl polyoxyethylene alcohol partial esters of citric, malic and tartaric acids. Preparation and use of several preferred partial esters of the class are detailed.

20 Claims, No Drawings

PARTIAL ESTERS OF HYDROXY POLYCARBOXYLIC ACIDS

The invention relates to new additives for inhibiting corrosion and deposits on the metal tubes and other metal parts that contact circulating water in a circulating water system.

Additives for the purpose of controlling corrosion and scale in such systems are added to the circulating water, usually in extremely small proportions. The most widely used additives for this purpose have been metal compounds which have the disadvantages of toxicity and the consequent difficulty of disposal. Some nontoxic, biodegradable organic additives which have been proposed have some inhibiting effect, but they are usually less than satisfactory. Metal compounds such as those containing chromates are offered commercially for these purposes and are quite suitable for inhibiting corrosion and scale but such metal-containing additives may pose a water pollution problem if they are discharged into a natural watercourse, U.S. Pat. No. 2,529,177 proposed the addition of certain hydroxy-polycarboxylic acids such as citric, malic, tartaric and mucic acids or their soluble salts in water systems for control of corrosion and tuberculation in the water pipes. That patent suggested that hydroxy-polycarboxylic acids may be attracted from the solution to metal surfaces in the system and would form, on the metal surfaces, a protective organic layer which to some extent does appear to inhibit corrosion and tuberculation. These additives have the advantages of non-toxicity and biodegradability but they are not sufficiently effective for practical control of corrosion and scale in most instances.

An object of the invention is to provide certain organic compounds useful as additives which effectively inhibit corrosion and scale in circulating water systems and which can be safely discharged into natural streams without danger of toxicity. The additives are effective for use in open systems, e.g. in cooling tower systems, as well as in closed systems where the water is not contacted with air.

The invention provides certain novel compounds that are useful as additives for control of corrosion and deposits in circulating water systems. The additives are used in very minor concentrations from about 10 to about 500 ppm in the circulating water. These additives are a class of organic compounds that have a combination of several functional moieties in the organic molecule, each such moiety being necessary or advantageous for the effective corrosion and scale inhibiting function of the additive. To provide an anchoring functional group in the molecules, the compound has a hydroxy polycarboxylic acid moiety which has at least one unesterified carboxylate radical. This radical functions to attract and hold (anchor) the organic molecule to the metal surfaces in the circulating water system. This anchoring effect is similar to that performed by a carboxyl radical in the hydroxy-polycarboxylate additives that were described in U.S. Pat. No. 2,529,177.

In addition, however, the molecule of an additive compound used for the present invention has an oleophilic terminal hydrocarbon chain of 8–20 carbon atoms and this chain in itself enhances the inhibiting function of the additive. In some embodiments, the compound functions in combination with an oil additive in the circulating water to further improve the inhibiting effect. The oleophilic terminal group in the compound can attract dispersed oil from the circulating water and hold it in the protective film which is formed by the compound on metal surfaces and this will even further enhance the inhibiting effect. When a very small proportion of the additive, usually in the range from 10 to 500 ppm, is dissolved in the circulating water, the additive will be attracted to or adsorbed on metal surfaces and it will form an effective protective film on such surfaces. When a very small proportion of oil is also dispersed in the circulating water with the additive, the oleophilic moiety of the additive compound will attract some of the dispersed oil to the protective film and this will even further improve the protective function of the film on metal surfaces in the system.

The presence of a terminal hydrocarbon chain attached to the molecule as the oleophilic moiety will usually tend to insolubilize the compound. Since solubility of the compound in water is necessary for the proper functioning of the inhibitor, the novel compounds of the invention further comprise a solubilizing moiety in addition to the other functional moieties described above.

In the molecule of a compound of the class defined, the oleophilic end group is a hydrocarbon radical having 8 to 20 carbon atoms selected from alkyl, alkenyl, cycloalkyl and aralkyl. This hydrocarbon group is connected in the molecule to a solubilizing group which is an oxyalkylene or a polyoxyalkylene chain having two or three carbon atoms in each oxyalkylene group and having 1 to 20 oxyalkylene groups in the solubilizing chain. The solubilizing group, in turn, is connected to one carboxyl group of a hydroxy-polycarboxylic acid moiety which in some embodiments may have another carboxyl group similarly connected with another polyoxyalkyl chain having a terminal hydrocarbon radical, of the kind described. The hydroxy-polycarboxylic acid moiety always includes a metal-attracting carboxylate terminal group having a cation such as hydrogen, an alkali metal or alkaline earth metal ion, an ammonium, alkylammonium or polyalkylammonium radical, or the like, which is capable of ionization in aqueous solutions.

The preferred compounds of the foregoing description can be expressed by the generic formula:

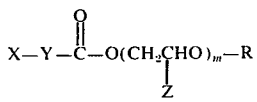

wherein:
R is a hydrocarbon radical having 8 to 20 carbon atoms selected from alkyl, alkenyl, cycloalkyl and arylalkyl;
m is a value from 1 to 5;
Z is hydrogen or methyl;
X is COOM
Y is selected from

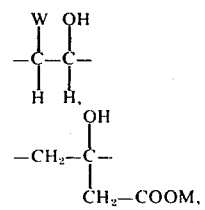

and

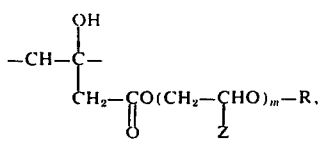

wherein
W is hydrogen or hydroxyl
m and Z are as defined before, and
M is selected from hydrogen, ammonium, alkylammonium, polyalkylammonium, alkali metal, or alkaline earth metal.

Compounds of the class defined can be conveniently prepared by condensation of a hydroxy-polycarboxylic acid, having 2 or 3 carboxyl groups with an alcohol or mixture of alcohols having the formula

wherein
R is alkyl having 8 to 20 carbon atoms and $m$ has an average value in the range from 2 to 5; at least one carboxyl group is left unesterified. The preferred hydroxy-polycarboxylic acids for the condensation are tartaric, malic, and citric acids.

Preferred alcohols for the condensation are alkyl- or alkaryl-polyoxyethylene alcohols, such as an ethoxylated higher alkanol or alkylphenol, having a terminal alkyl or alkylphenol group containing 8 to 20 carbon atoms and having an average of about three oxyethylene repeating groups in the polyether chain. Instead of oxyethylene, the repeating groups may be oxyisopropylene. The condensation products, which may be used either as the soluble acids or as soluble ionic salts of the acids, produce excellent inhibition of corrosion and scale when used alone as additives, and in many instances produce even more remarkable results when used in combination with a small amount of oil which is dispersed as an additional additive in the circulating water system.

Following is a description of the preparation of some of the preferred compounds of the class described and their use in a test apparatus that was designed for measuring the ability of the additive to inhibit corrosion and scale in typical circulating water systems.

EXAMPLES

I. Acid-Ester Preparation

A. To a reaction flask equipped with a stirrer and a reflux condenser are added 28.8 parts by wt. (0.15 mole) of anhydrous citric acid and 98 parts by by wt. (about 0.3 mole) of a mixture of ethoxylated alcohols (sold under the tradename Alfonic 1014–40), of the structure $R(OCH_2CH_2)_m$ OH (R is alkyl having 10–14 carbon atoms; average number of C atoms in R = 12.6, average $m$ = 2.9, average mol wt. = 323), also 150 parts by wt. of methyl ethyl ketone (MEK) as diluent and 6.9 parts by wt. of boron trifluoride etherate as catalyst. The reaction is carried out under reflux at a temperature of about 87°C. for about 3 hours. MEK is then distilled off; the final pot temperature is 120°C. The distillation residue is the condensation product, called Product A. The acid number is 109 and the saponification number is 98.2 (mg KOH/g.). Calculated composition of the condensation product is 58 molar % of the monoester and 42 molar % of the diester.

B. Thirty parts by wt. (0.2 mole) of tartaric acid and 63.7 parts by wt. (0.2 mole of Alfonic 1014–40) are reacted, in toluene which serves as an azeotropic agent, at 140°–150°C. until 3.6 parts (0.2 mole) of the water of condensation is distilled off. Toluene is then distilled off. The reaction product is further stripped of volatile material under vacuum (<1 mm. pressure). The residue is the condensation product designated Product B. Its saponification number is 130 (theory 125).

C. Equimolar quantities of malic acid and Alfonic 1014–40 are reacted in a round bottom flask equipped with a stirrer, condenser, thermometer, and a nitrogen gas purge. The reaction is carried out at 110°–130°C. with the aid of some toluene for about 4 hours, and is stopped after the calculated weight of water of condensation is distilled off. The finished product has an acid number of 124 (theory 128) and a saponification number of 134 (theory 128). This product is designated Product C.

D. Equimolar quantities of malic acid and Alfonic 1412–40 are reacted directly in a reaction flask equipped with a stirrer, condenser, thermometer and a nitrogen purge. Alfonic 1412–40 is the tradename for a mixture of alcohols of formula $C_nH_{2n+1}(OCH_2CH_2)_3$ in which $n$ is in the range from 12–14 and the average value of $n$ is 13.6 and the average molecular weight is 340. The reaction is carried out at 124°–130°C. for about 5 hours. The condensation product, designated D, has an acid number 123 (theory 123) and a saponification number 123 (theory 123).

E. Equimolar quantities of citric acid and Alfonic 1412–40 are reacted at 125°–140°C. for about 3 hours. Water of condensation is removed through a condenser and a trap. The condensation product has an acid number 215 (theory for monoester 218) and a saponification number 108 (theory 109). The product is designated Product E.

F. Example D is repeated using equimolar quantities of malic acid and Neodol 23–3 which is a mixture of alcohols having the formula $C_nH_{2n+1}(OCH_2CH_2)_3OH$ in which $n$ has an average value of 12.7 and the alcohols have average molecular weight of 327. The reaction is carried out at 125°–140°C. for about 4 hours. The condensation product, designated F, has an acid number 115 (theory 127) and a saponification number 138 (theory 127).

In carrying out the condensation of a hydroxy-polycarboxylic acid and an alkyl-polyoxyalkylene alcohol, the molar ratio of alcohol to acid can vary in the range from about 2/1 to about 1/1 in the case of citric acid. When condensing with a dibasic acid, the molar ratio does not have to be exactly 1/1, a slight excess up to about 25% of either of the reactants is permissible. As the alcohol is usually more volatile than the acid, a slight excess of the alcohol is usually preferred.

II. Tests in Laboratory Test Apparatus

The corrosion tests are carried out in laboratory heat exchanger units designed and built for the test purpose. The heat exchanger has a single tube made of SAE 1010 mild steel and having ½ inch outside diameter. This tube is enclosed in a glass jacket equipped with inlet and outlet arms, about 1 foot apart. The tube is steam-heated on the inside and cooled on the outside by recirculating water which is circulated from a reservoir through the jacket and then back to the reservoir for cooling. Water temperature in the reservoir is maintained at about 45°C. The steam supply to the tube is regulated to maintain a temperature rise of one degree C. from entry to exit of the cooling water in the jacket. The rate of flow of cooling water in the jacket is kept at about 3 linear feet per second. Preweighed coupons of SAE 1010 steel measuring 3 × ⅜× 1/16 inch are immersed in the path of the recirculating water. The test is run continuously for one week, at the end of which the coupons are removed, cleaned by a conventional procedure and reweighed. The rate of corrosion, calculated from the measured weight loss and the time for the test, is expressed in terms of mils per year (mpy). After each test, the heat exchanger tube is disassembled, examined, and the solids deposited on its surface are dried, removed and weighed by a standard procedure. The weight of deposit removed, expressed directly in milligrams, indicates a comparative value of the actual formation of scale on the surface.

The cooling water used for each test is of controlled hardness and is made by adding weighed quantities of chemicals to deionized water. The characteristics of the cooling water are as follows:

| | |
|---|---|
| Total hardness, as ppm $CaCO_3$ | 550 |
| Ca hardness, as ppm $CaCO_3$ | 410 |
| Mg hardness, as ppm $CaCO_3$ | 140 |
| $SiO_2$, ppm | 35 |
| Methyl orange alkalinity | 60 |
| Chloride, ppm | 300 |
| Sulfate, ppm | 300 | pH is maintained about pH 7 throughout the test.

Tests of several compounds selected from the defined class of additives, in a use according to the invention, are carried out in the laboratory test apparatus as described above. In each test a measured amount of the selected compound is added to the cooling water to make the concentration in ppm shown in Table 1 for the test. In some of the tests, measured amounts of a selected oil and a selected surfactant are also added to make the concentrations shown in ppm of oil and surfactant in the cooling water. When an oil is used, it is preferably mixed with the surfactant and with the partial ester-acid compound in the relative proportions to be added for the test before the mixture is added into the water. This pre-mixing procedure is followed for all of the examples described in Table 1 in which an oil was used. Such pre-mixing of the partial ester and the oil before addition is a preferred practice but the components can be added separately to the circulating water if one wishes to do so. To illustrate certain improvements that are obtained by the use of compounds embodying the invention, several control or comparative tests are made with additives which do not embody the invention, and the results of those tests are also recorded in Table 1. Several light hydrocarbon oils of various types are used for these tests and they are identified in Table 1 by the tradenames under which they were obtained. All of these are light mineral oil fractions. Other oils such as other dispersible hydrocarbon oils or vegetable oils would be suitable. The surfactant used in the examples to disperse the oil is Surfonic N-95, a nonylphenyl polyoxyethylene alcohol having an average of 9.5 repeating oxyethylene groups. When a dispersant is needed, a nonionic surfactant is preferred. In some instances the additive compound of the invention is sufficient to disperse the oil in the water without added surfactant.

TABLE 1

| Test No. | Additives (Concentration ppm in Cooling Water) | | | | | Test Results | |
|---|---|---|---|---|---|---|---|
| | Partial Ester Product from the Preparation Indicated (or Other Additives) Additive | ppm | Oil (Tradename) | ppm | Surfactant-Surfonic N-95 ppm | Corrosion Rate mpy | Deposit mg |
| Control 1 | None | | None | | None | 70 | 5000 |
| Control 2 | None | | (Fractol A) | 50 | 10 | 48 | 3400 |
| Comparative 3 | (Citric Acid) | 50 | None | | None | 45.2 | 4202 |
| Comparative 4 | (Citric Acid) | 50 | (Fractol A) | 50 | 10 | 45.8 | 2775 |
| Example 5 | A | 100 | None | | None | 2.5 | 202 |
| Example 6 | A | 67 | (Fractol A) | 33 | 10 | 2.5 | 7.2 |
| Example 7 | A | 67 | (Carnation Oil) | 33 | 10 | 2.5 | 8.4 |
| Example 8 | B | 50 | (Fractol A) | 50 | 10 | 2.2 | 89 |
| Example 9 | C | 100 | None | | None | 6.1 | 2116 |
| Example 10 | C | 50 | (Fractol A) | 50 | 10 | 2.0 | 20 |
| Example 11 | D | 50 | (Semtol-70) | 50 | None | 1.5 | 39 |
| Example 12 | E | 75 | (Mentor 28) | 75 | None | 3.4 | 141 |
| Example 13 | F | 50 | (Semtol-70) | 50 | None | 2.3 | 9.0 |
| Example 14 | F | 50 | (Coray-37) | 50 | Surfonic N150 5 ppm | 1.4 | 6.0 |

For comparison, to point out the invention, two half esters not having the polyoxyalkylene solubilizing group were prepared by conventional esterification and tested. These were the half ester of malic acid with dodecanol and the half ester of malic acid with Alfol 1618. In a test like the one described above these two half esters were found to be insoluble in the cooling water used and hence were not useful as inhibitors. These half esters have the anchoring and the oleophilic moieties but do not have the solubilizing polyoxyalkylene group. Alfol 1618 is a mixture of alkanols having 16 to 18 carbon atoms.

In the foregoing examples, all of the additive compounds that were used in accordance with the invention comprised the solubilizing group —($CH_2CH_2O$—)$_m$ wherein $m$ is an average value about three. Other compounds of the class described having polyoxyethylene groups with average values of $m$ from about 2 to about 11 have been tested and most were found to have at least some inhibiting effect with respect to inhibition of corrosion or scale or both, by comparison with the control tests. By far the best results, however, are obtained with additive compounds of the class defined wherein $m$ is an average value about 3, as in the examples described in Table 1. Compounds of the class described having a polyoxyalkylene chain such as polyoxyisopropylene instead of polyoxyethylene as the solubilizing moiety can be used according to the invention.

The oleophilic moiety in compounds according to the invention comprises a terminal hydrocarbon radical having 8 to 20 carbon atoms. In the examples above the invention is described using the most preferred alcohols, having terminal alkyl groups containing 10 to 14 carbon atoms, but other additive compounds having other hydrocarbon terminal groups such as nonylphenyl, alpha-butylbenzyl, p-butylbenzyl, ethyl cyclohexyl, $C_8$ to $C_{20}$ alkyl, octadecenyl, undecenyl or the like. These can be prepared for use in the invention by ethoxylation of an alcohol that corresponds to the selected hydrocarbon group, by conventional means to make the ethoxylated alcohol. The product, in turn, is esterified with an hydroxy-polycarboxylic acid to make an additive compound of the invention.

The acid moiety in the molecule is selected from the hydroxy (including polyhydroxy) dicarboxylic and tricarboxylic acids such as malic, tartaric, citric acids and the like.

The partial esters of the invention are used in aqueous solution in which the cation of the unesterified carboxyl is ionized. The partial esters include the soluble salts in which the unesterified carboxyl may have any cation such as alkali metal, alkaline earth metal, ammonium, alkylammonium dialkylammonium or the like. Such salts are prepared by conventional neutralization with a selected base.

We claim:

1. A partial ester of a hydroxy lower alkyl polycarboxylic acid having at least one unesterified carboxylate radical in the molecule and having at least one other carboxyl group of the molecule esterified with an alcohol having the formula

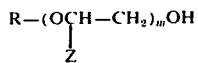

wherein
 $m$ is an integer from 1 to 20
 Z is hydrogen or methyl and
 R is alkyl, alkenyl, cycloalkyl or aralkyl having 8 to 20 carbon atoms.

2. A partial ester defined by claim 1 wherein the hydroxy-polycarboxylic acid is malic acid and one carboxyl group of the acid is esterified with an alcohol of the defined formula wherein
 $m$ is an integer from 2 to 5 and
 R is alkyl having 8 to 20 carbon atoms.

3. A partial ester defined by claim 1 wherein the hydroxy-polycarboxylic acid is tartaric acid and one carboxyl group of the acid is esterified with an alcohol of the defined formula wherein
 $m$ is an integer from 2 to 5 and
 R is alkyl having 8 to 20 carbon atoms.

4. A partial ester defined by claim 2 wherein the value of m is 3.

5. A partial ester defined by claim 3 wherein the value of m is 3.

6. A partial ester defined by claim 2 wherein R is alkyl having 10–14 carbon atoms.

7. A partial ester defined by claim 4 wherein R is alkyl having 10–14 carbon atoms.

8. A partial ester defined by claim 3 wherein R is alkyl having 10–14 carbon atoms.

9. A partial ester defined by claim 5 wherein R is alkyl having 10–14 carbon atoms.

10. A partial ester defined by claim 2 wherein R is alkyl having 12–14 carbon atoms.

11. A partial ester defined by claim 4 wherein R is alkyl having 12–14 carbon atoms.

12. A partial ester defined by claim 1 wherein the hydroxy-polycarboxylic acid is citric acid.

13. A partial ester defined by claim 12 wherein the defined partial ester is a monoester of citric acid.

14. A partial ester defined by claim 12 wherein the defined partial ester is a diester of citric acid.

15. A partial ester defined by claim 12 wherein the value of $m$ is about three.

16. A partial ester defined by claim 15 wherein R is alkyl having 10 to 14 carbon atoms.

17. A partial ester defined by claim 13 wherein the value of $m$ is 3.

18. A partial ester defined by claim 14 wherein the value of m is 3.

19. A partial ester defined by claim 17 wherein R is alkyl having 10–14 carbon atoms.

20. A partial ester defined by claim 18 wherein R is alkyl having 10–14 carbon atoms.

* * * * *